United States Patent [19]

Allen

[11] 4,349,002
[45] Sep. 14, 1982

[54] INTERNAL COMBUSTION ENGINE FUEL TREATMENT APPARATUSES AND PROCESS

[76] Inventor: Wesley H. Allen, Rte. 5, Box 84, Amarillo, Tex. 79118

[21] Appl. No.: 226,934

[22] Filed: Jan. 21, 1981

[51] Int. Cl.³ .................................................. F02M 31/00
[52] U.S. Cl. .................................. 123/557; 123/523; 123/525; 123/575
[58] Field of Search .............. 123/523, 525, 527, 575, 123/577, 576, 578, 557, 3

[56] References Cited

U.S. PATENT DOCUMENTS

| | | | |
|---|---|---|---|
| 2,073,282 | 3/1937 | McCartney | 123/557 |
| 3,014,474 | 12/1961 | Banker | 123/575 |
| 3,022,425 | 2/1962 | Rockstead | 123/575 |
| 3,380,442 | 4/1968 | Johnson | 123/557 |
| 3,469,954 | 9/1969 | Hoffman | |
| 3,688,755 | 9/1972 | Grayson et al. | 123/575 |
| 3,783,841 | 1/1974 | Hirschler, Jr. et al. | 123/557 |
| 3,783,849 | 1/1974 | Bremfitt | 123/575 |
| 3,788,283 | 1/1974 | Perry | 123/557 |
| 3,794,000 | 2/1974 | Hodgkinson | 123/557 |
| 3,799,125 | 3/1974 | Hutchinson | 123/575 |
| 3,805,756 | 4/1974 | Madariaga | 123/575 |
| 3,807,377 | 4/1974 | Hirschler, Jr. et al. | 123/575 |
| 3,838,673 | 10/1974 | Csicsery et al. | 123/3 |
| 3,851,633 | 12/1974 | Shih | 123/525 |
| 3,854,463 | 12/1974 | Burden, Sr. | 123/525 |
| 3,888,223 | 6/1975 | Mondt | 123/525 |
| 3,906,915 | 9/1975 | Bednarczyk | 123/575 |
| 3,933,130 | 1/1976 | Csicsery | 123/3 |
| 3,985,108 | 10/1976 | Matsumoto | 123/3 |

*Primary Examiner*—Ronald H. Lazarus
*Attorney, Agent, or Firm*—Ely Silverman

[57] ABSTRACT

In a vehicle comprising a liquid-cooled gasoline fueled internal combustion engine a supplemental adapter apparatus comprising tanks, valves and conduits is incorporated into the cooling system and fuel system of that internal combustion engine with some modification of the fuel feeding and the cooling systems of that engine and continually utilizes the normally unused heat of the liquid coolant of such engine to fractionate liquid fuel mixtures fed to that engine with continual intermittent use of resulting separate fractions thereby formed to improve the efficiency of conversion of the potential energy of such liquid fuel to mechanical energy.

11 Claims, 15 Drawing Figures

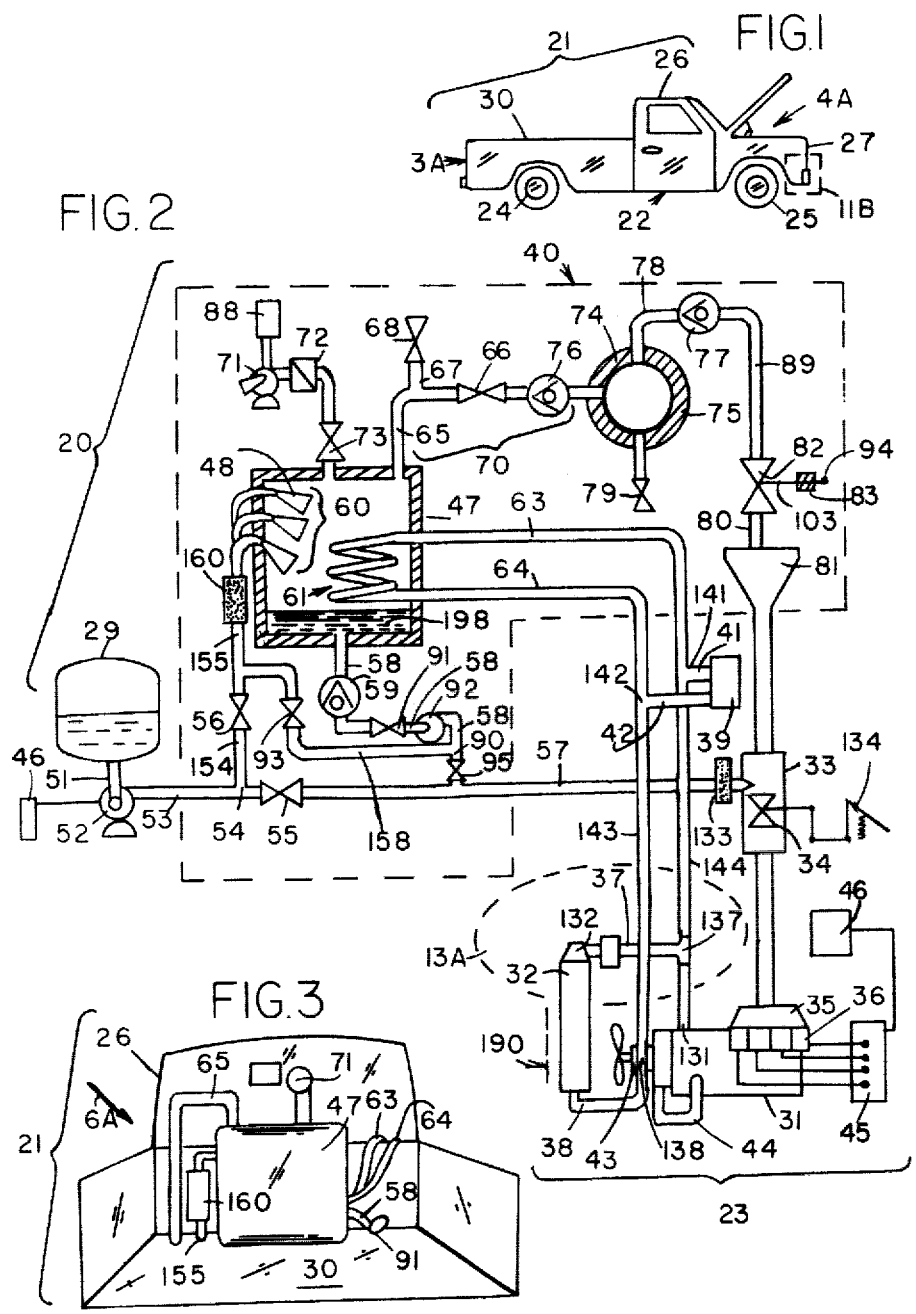

INTERNAL COMBUSTION ENGINE FUEL TREATMENT APPARATUSES AND PROCESS

BACKGROUND OF THE INVENTION

1. The Field of Art

The fields of invention to which this invention pertains are charge forming devices involving heating of fuel for internal combustion engines.

2. Description of the Prior Art

Generally, gasoline contains compounds having an average molecular weight of 110 to 115 and boiling points of up to 400 degrees F. (while kerosene has average higher molecular weight of 165 to 180 and boiling points of up to 550 degrees F.). Also, generally, high volatility fractions in gasoline are deemed undesirable to avoid vapor lock tendencies and knocking. More particularly, gasoline is a liquid mixture of hydrocarbons having boiling points from about 80 degrees F. to 430 degrees F. and full boiling gasolines have both low and high molecular weight constituents with varied boiling points, from 95 degrees F. for pentane to 450 degrees F. for hendecane. The saturated compounds in gasoline vary, e.g. from 40 to 80%; and the olefins vary, e.g. from 0 to 30%; as do aromatics, e.g. from 2 to 40%. Additionally, blending procedures are used depending upon the climate. The saturated compounds are mixtures of virgin (straight run) gasoline and conventional alkylation and isomerization procedures vary the molecular composition of hydrocarbon components while additives as tetraalkyl lead antiknocks and other agents are present in such liquid fuel known generally as "gasoline." The net effect of such mixture is a varied chemical composition with, also varied amounts of components of different ranges of boiling point. Such fuels are used under varied engine speed and engine load conditions. Accordingly, while the gasoline fuel is flexible for purpose of availability, engine starting and adapting to differing load conditions of internal combustion engines, there has been for a long time a need for more efficient use of the energy of such fuel.

SUMMARY OF THE INVENTION

The normally dissipated heat of hot liquid of the cooling system of a liquid cooled gasoline-fueled internal combustion engine is used to separate the components of the liquid fuel mixture into a first, more volatile, vaporized fraction and a second, less volatile, liquid fraction. The fractions are separately mixed with air and controllably fed to the combustion chambers of the vehicle during different periods of time. Thereby the overall efficiency of conversion of the potential combustion energy of the liquid fuel so treated to mechanical energy is enhanced over the usual carburetion and combustion of the fuel mixture.

BRIEF DESCRIPTION OF THE DRAWINGS

FIG. 1 is a side view of a truck 21 incorporating one embodiment of apparatus according to this invention.

FIG. 2 is an overall diagrammatic showing of the connections and relations of the components of a system and apparatus 20 according to one embodiment of this invention.

FIG. 3 is a rear oblique view of apparatus elements of system 20 in the bed of the truck of FIG. 1 as seen looking along the direction of 3A of FIG. 1.

FIG. 9 is a view along the direction of arrow 4A of FIG. 1 of apparatus element according to embodiment 120.

FIG. 10 is a diagrammatic sectional view of the interior of evaporator tank 147 which tank is shown broken away along a vertical diametrical longitudinally extending plane.

DESCRIPTION OF THE PREFERRED EMBODIMENTS

Figure 4:
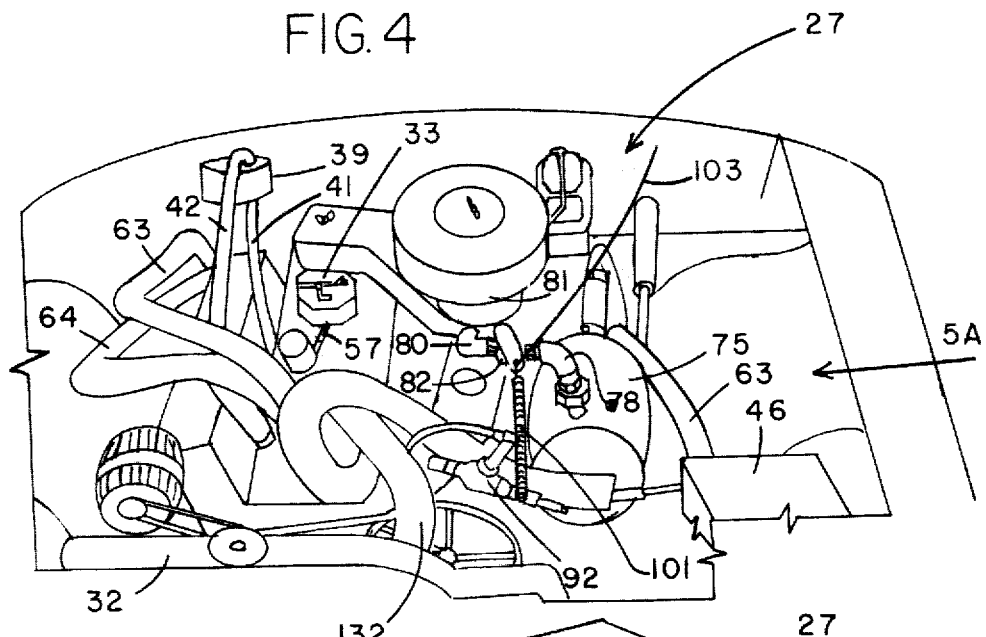
FIG. 4 is a top view of apparatus elements in the engine compartment 27 of truck 21 of FIG. 1 as seen along the direction of the arrow 4A of FIG. 1.
Figure 5:
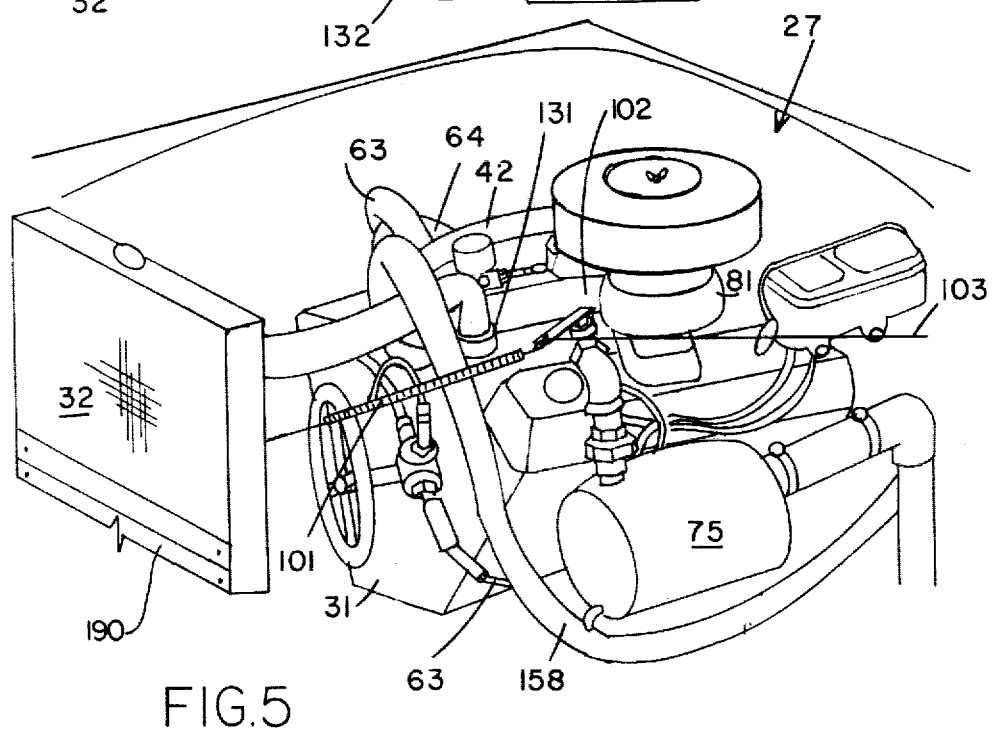
FIG. 5 is a left oblique view of apparatus elements in the engine compartment 27 looking along the direction of the arrow 5A of FIG. 4, with the left front wheel well and left engine compartment wall removed.
Figure 6:
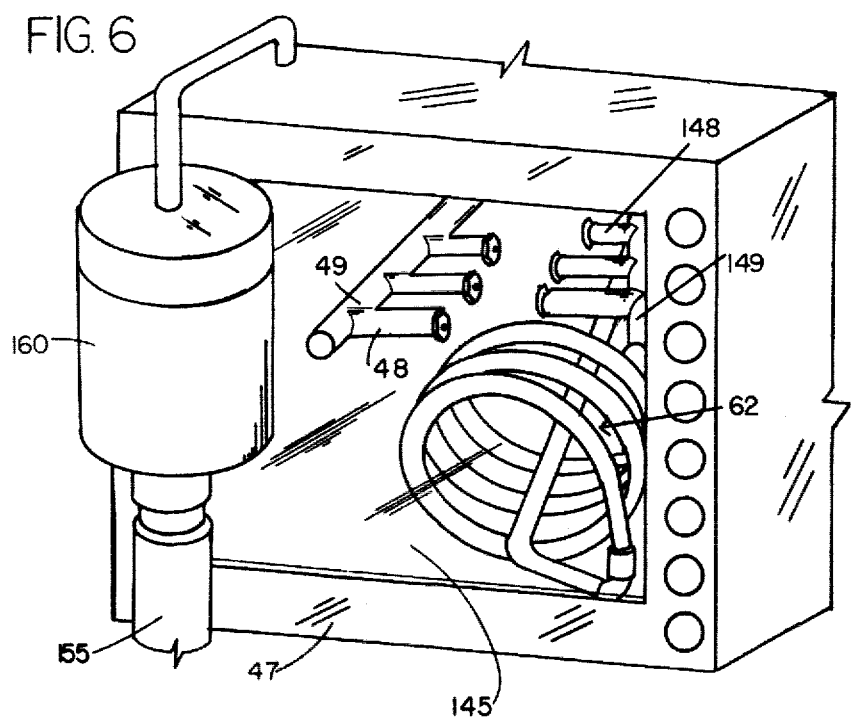
FIG. 6 is a side view looking into the evaporator compartment of FIG. 3 as seen along the direction of the arrow 6A of FIG. 3.
Figure 7:
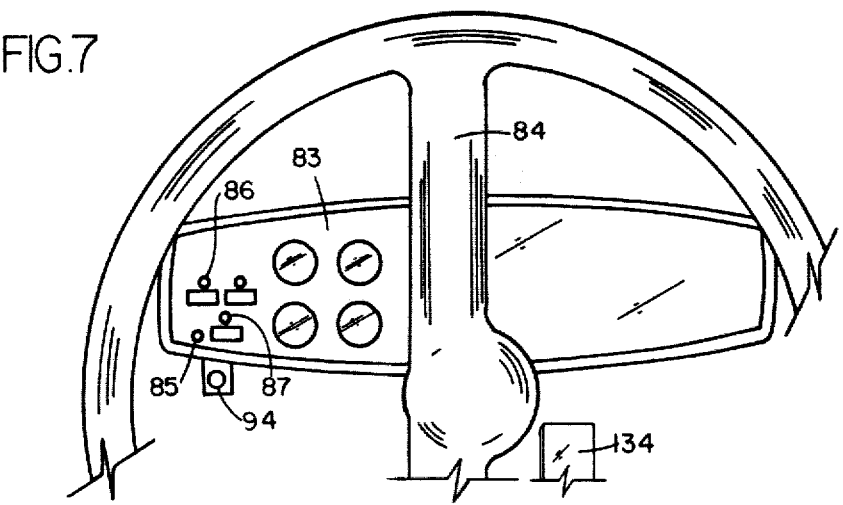
FIG. 7 is a view of control element location on the dashboard 93 in the cab 26 of the vehicle 21 of FIG. 1 for the system of FIGS. 2-6.
Figure 8:
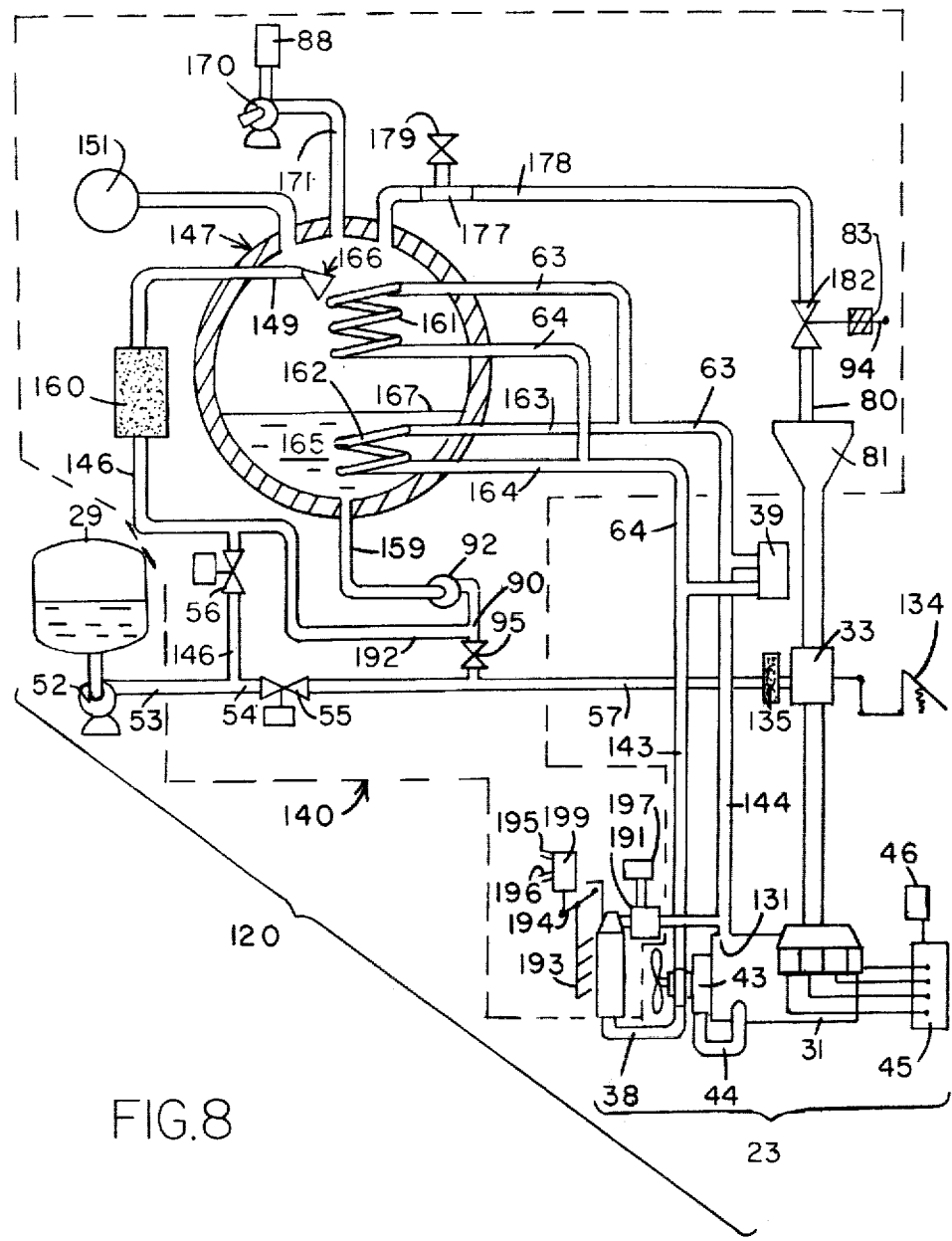
FIG. 8 diagrammatically shows components and connections of another system, 120, according to this invention wherein the vaporization tank 47 and storage tank 75 of the system shown in FIGS. 2, 3 and 6 are combined into one structure which one structure is located within the engine compartment of the vehicle.
Figure 9:
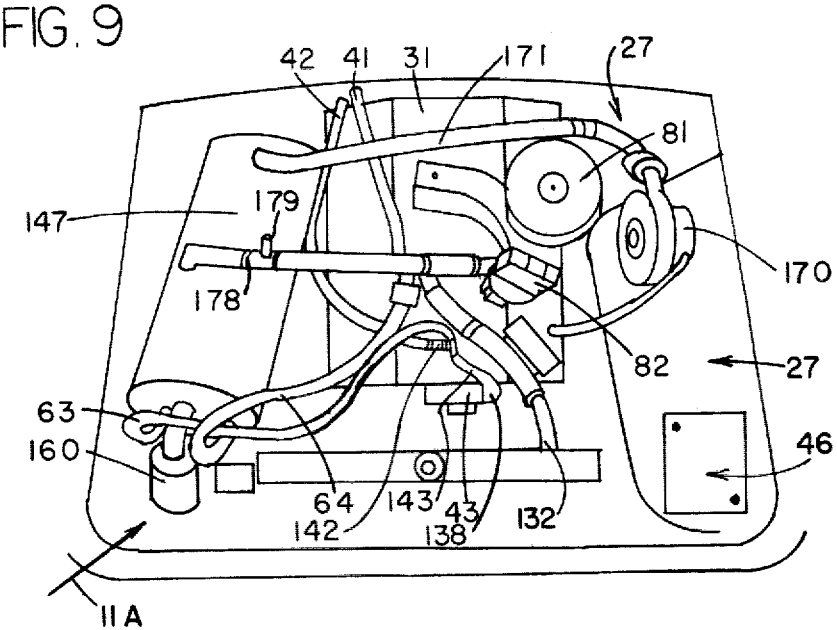
FIGS. 9 and 10 show pictorial and scale views of the embodiment shown diagrammatically in FIG. 8.
Figure 10:
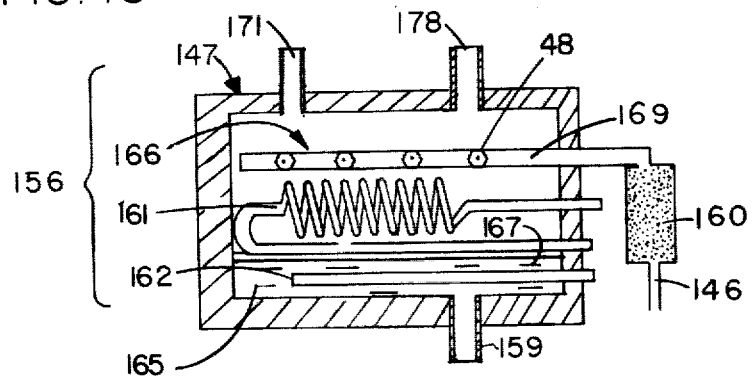
Figure 11:
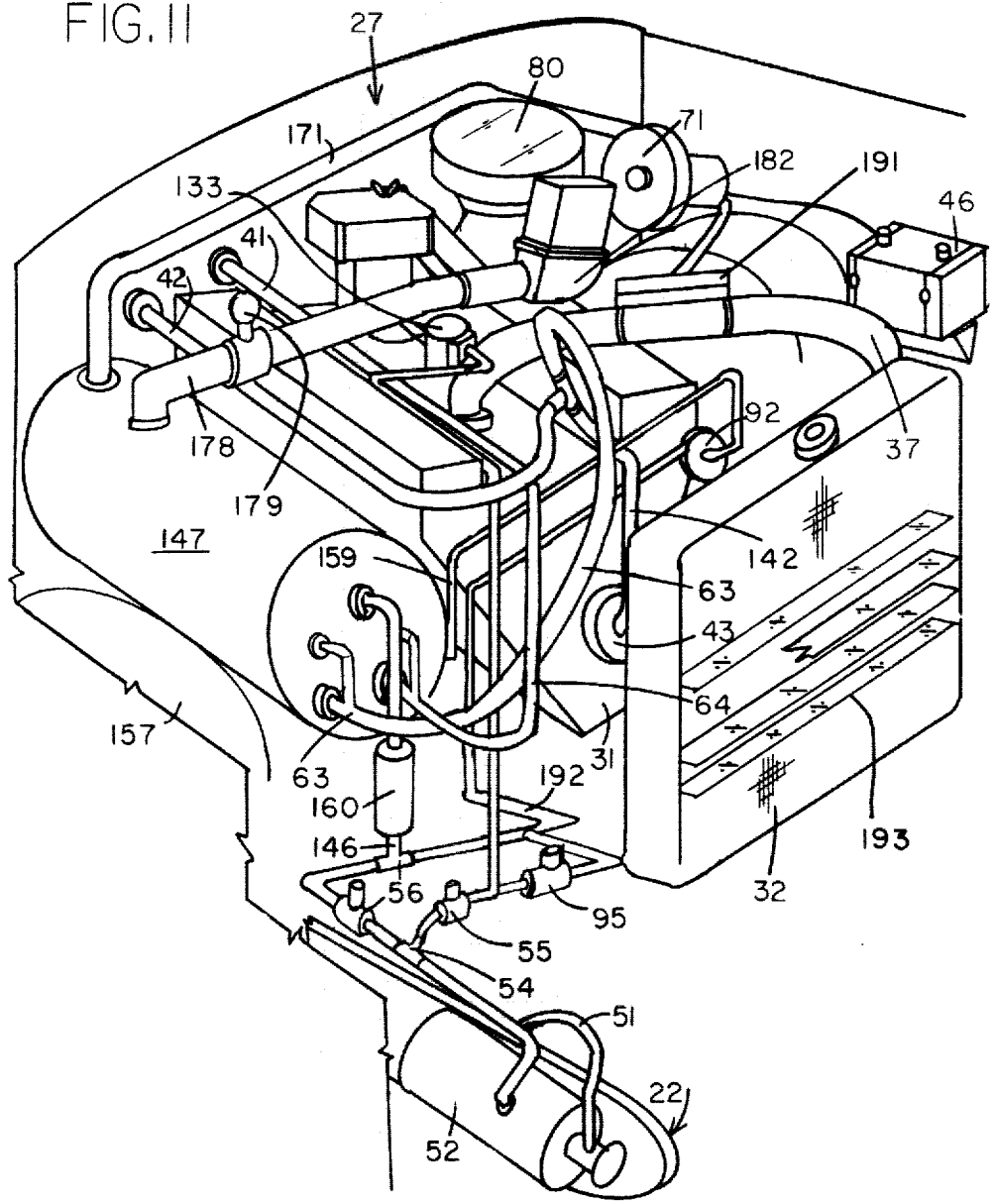
FIG. 11 is a composite left side oblique view along the direction of the arrow 11A of FIG. 9 and also a view of a pump located in broken-away zone 11B of FIG. 1 to show operative connections of the parts of the embodiment 120.
Figure 12:
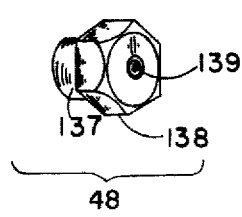
FIG. 12 shows a detailed view of one of the nozzles.
Figure 13:
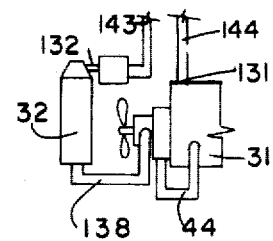
FIG. 13 shows an alternative connection of the conduits in zone 13A of FIG. 2.

Embodiments 20 and 120 of apparatus according to this invention provide for ready modification of existing internal combustion engines by adding the pumps, tanks and valves within the dotted areas of FIGS. 2 and 8 and the controls therefor to the dashboard and permits standard gasoline to be used for such engines. The apparatus of embodiments 20 and 120 may be sold as kit for installation on pre-existing cars or be employed on new cars.

Embodiment 20

In general, the system 20 of invention comprises a combination of (a) an internal combustion engine 23 and the fuel supply assembly therefor and (b) an auxiliary fuel treatment system 40. The parts of the internal combustion engine of particular significance to this system and which are modified in the system 20 are the portions thereof that provide heated cooling liquid to the radiator of the engine which heat is normally wasted so far as mechanical energy is concerned and which heated liquid is usually passed to the radiator of the engine to be dissipated to avoid interference with the operation of the engine in order to maintain proper operating temperature of the internal combustion engine. The fuel storage and delivery system of the engine 23, which normally passes a liquid vaporizable combustible fuel mixture to the carbeurator of the engine, is also modified to cooperate with the auxiliary fuel treatment system 40.

The apparatus of embodiment 20 is attached onto an internal combustion engine powered vehicle as a pick up truck 21. Such vehicle comprises a body and frame assembly 22 and an engine assembly 23. The body and frame assembly is operatively connected to and supported on wheels as 24 and 25 and comprises a cab 26, an engine compartment 27 and a carrier compartment or bed 30 and supports a fuel tank 29.

The compartment 27 has a normally closed hood 28, which hood is shown open in FIG. 1 to illustrate the position of parts illustrated in the other figures of the drawings. The engine assembly 23 comprises an engine block 31, a radiator 32, a liquid gasoline carburetor 33 on the top of the block, with a throttle 34 operatively connected within the carburetor, a manifold 35 connected at its inlet to the discharge end of the carburetor and at its outlets to cylinder chambers 36 within the engine block 31. A radiator inlet conduit 37 extends from the coolant liquid outlet opening 131 of the engine block 31 to the coolant liquid inlet opening 132 of the radiator 32. A radiator outlet conduit 38 connects from the outlet of the opening of the radiator to an engine coolant liquid or water pump inlet 43. Conduit 37 is connected to the cab heater inlet line 41 of the cab heater 39 by a tee 137. A tee 41 connects the evaporator coil inlet line 63 and the main heater inlet line 144. A tee 142 connects the evaporator conduit line 64 and the cab heater outlet line 42 to the main heater outlet line 143. The radiator outlet conduit line 38 and the main heater outlet conduit line 143 join each other at a tee 138 which is operatively connected to the water pump inlet 43. The water pump 43 is connected to and driven by the engine assembly 23 and is supported on and operatively attached to the engine block 31. A pump discharge conduit 44 returns cooled liquid under pressure to the engine block. A distributor 45 is connected to spark plugs in the engine chambers as 36 and an electric battery 46 are connected operatively to each other. The distributor is attached to and supported on the engine block 31 and the electric battery 46 is supported on a wall of the engine compartment. According to embodiment 20 of this invention and evaporator chamber 47 is provided for attachment to vehicle 21 and operates on the liquid fuel mixture fed from the fuel tank 29 into engine block 31. The evaporator chamber 47 includes a plurality of like spray producing heads as 48 and 148 each of which spray heads is fed by a spray conduit line as 49 and conduit 149 each operatively connected through conduits and valving, below described, to the fuel tank 29 via a filter 160.

The fuel tank 29 has firmly connected thereto a liquid fuel discharge conduit line 51 which is connected to a fuel pump 52. Pump 52 is attached firmly to frame assembly 22 and has a discharge line 53 which operatively connects to a tee 54. One arm of the tee 54 connects via carburetor feed conduit control valve 55 and carburetor feed conduit 57 to the carburetor 33. The other arm of the tee 54 connects to the spray head conduit lines 49 and 149 through evaporator inlet lines 154 and 155 and filter 160 and valve 56. The tee 54 is thereby connected either to the spray head conduit 49 through valve 56 or to carburetor 33 via a fuel conduit control valve 55 or to both conduit 49 and carburetor 33.

The evaporator chamber has, at its bottom, an evaporator liquid discharge check valve 59 and liquid conduit line 58 which connects to the interior of the evaporator chamber 47 and also, via control valves 91 and 95 and pump 92, to the conduit 57.

An auxiliary fuel pump 92 is attached to and driven by fan belt of engine 23. The discharge conduit of the pump 92 is connected by one arm of a tee 90 to carburetor feed conduit line 57 and by another arm of the tee 90 through a solenoid controlled valve 93 to the spray head feed conduits 49 via line 155.

Liquid discharge line 58 extends from the bottom of tank 47, as shown in FIG. 3, along the bottom of the cab 26 together with evaporator gas discharge conduit 65 within a sturdy polyvinyl chloride tube as a protective shell therefor, and extends to the inlet of the pump 92 in compartment 27. The discharge conduit 158 of pump 92 travels under the cab 26 with line 65 to near to the juncture of conduits 158 and 155.

The evaporator chamber 47 is a rigid insulated gas-tight chamber within which are located an evaporator coil assembly 61 and a spray head assembly 60. The spray head assembly comprises a plurality of like spray heads as 48 and 148. The spray heads are operatively connected to and supported on spray head conduits 49 and 149. Conduit 49 and 149 are each a rigid pipe supported near top of chamber 47 and each is spaced away from coil assembly 61 and supports the spray heads thereon at a distance from the parts of the coil assembly 61. Chamber 47 is provided with a transparent glass window 145.

The evaporator coil assembly 61 comprises a plurality of rigid helical evaporator coil segments as 62 and is connected to a coil inlet conduit line 63 and to a coil outlet conduit line 64. These coils are located near to but spaced away from the spray heads as 48 and 148. An evaporator discharge conduit line unit 70 comprises a serially connected evaporator discharge conduit 65, an evaporator discharge cut-off valve 66, an evaporator waste line 67 and an evaporator conduit line valve 68. The evaporator tank discharge conduit line 70 connects through a check valve 76 into a gas storage tank 75 near its center. Storage tank 75 is connected to storage tank outlet conduits 78 and 89 and check valve 77 to throttle valve 82, which connects via terminal portion 80 of the storage tank outlet conduit, to the inlet of gas carburetor 81. Tank 75 has a storage discharge line 78 at its top and a liquid discharge control valve 79 at the bottom of the tank 75. A substantial amount of insulation 74 evenly surrounds all walls of the tanks 47 and 75.

A fan 71 is firmly supported on top of tank 75 and is connected to battery 46 through switch 84. The discharge line of such fan is connected by a safety flapper valve 72 and a solenoid controlled cut-off valve 73 to the interior of the evaporator chamber 47.

A natural gas carburetor 81 is operatively connected to the inlet of the carburetor 33. On the instrument panel 83 within the vehicle cab 26 adjacent the steering wheel 84 are control switches 85, 86 and 87 for operative connection with control valves 55, 56, 66, 73, 91, 93 and 95 of the apparatus 20.

The evaporator tank 47 is located on the bed 30 of the pick up truck 21 or may be located in a closed vehicle such as a sedan within the trunk compartment where there is insufficient space within the engine compartment of the vehicle to accommodate such size tank as 47 which is 3 feet long, and 2 feet high and wide on its interior.

The throttle valve 82 in conduit line 80 is normally held closed by a spring 101 which spring 101 is attached to an arm 102 of valve 82 and to the frame of radiator 32 which radiator is firmly fixed to the frame 22 and held in fixed relationship to the engine block 31. The throttle control cable 103 is also connected to the arm 102 and to a throttle control rod 94 on dashboard 83 in the cab 26. The throttle control rod 94 serves to open the throttle 82 and the foot pedal 134 for and connected to valve 34 in carburetor 33 then controls the amount of combustible mixture fed to the engine 31.

The control switches 85, 86 and 87 in cab 26 are spring loaded snap switches which are each firmly yet releasably held on or off position. When all of the switches 85, 86 and 87 are in their "off" or open circuit mode or position, and engine 31 is operating, gasoline from tank 29 is pumped by pump 52 and flows through valve 55 and line 57 to carburetor 33.

When control switch 876 is put into its "on" or closed circuit mode, and engine 23 is operating, vaporization of gasoline occurs in tank 47. Such vapors are passed by line 70 to tank 75 and from tank 75 to line 80 and carburetors 81 and 33 under control of the operator in cab 26 via foot pedal 134 while the liquid 198 gathered in tank 47 is cycled by pump 92 through valves 91 and 93 to spray head assembly 61 because of the actuation of normally closed solenoid valves 56, 66, 91 and 93 and actuation of the normally open solenoid valves 55 and 95; those solenoids are actuated by closure of an electrical circuit from the battery 46 through switch 86, which switch 86 acts on a circuit means, such as relay 126 provided with multiple arms, to actuate the several solenoids 55, 56, 66, 91, 93, and 95 without interference between those and other switches during the rest and actuation states of those and other switches and solenoids.

The continued operation of the pump 92 continuously returns the liquid portion 198 of liquid fed by spray heads as 48 to tank 47 until substantially all the portions of the liquid gasoline mixture fed to tank 47 that can evaporate at the temperature of the evaporator coils 61 have been evaporated, although initially such liquid does not evaporate because the capacity of the coil assembly to evaporate liquid is smaller than the volume of liquid applied thereagainst by the spray heads. This operation of the apparatus provides for initial production of low boiling vapors to carburetor 33 and consequent ready engine starting, with following production of vapors of progressively higher boiling point: such boiling point characteristic levels off or stabilizes with production of vapors having a boiling point which is substantially the temperature of the coolant liquid discharged from the engine at outlet opening 131. After exhaustion of such vapor from the tank 47 or other termination of such operation, switch 86 is turned off and control switch 87 is put into its "on" or closed circuit mode. Switch 87 actuates a multi-armed relay 127 to open normally closed valves 91 and 73 whereby, with engine 23 operating, the liquid 198 in the tank 47 is passed from the tank 47 through the then normally open valve 95 to line 57 and thence to the carburetor 33. That feeding of the liquid fraction of fuel then remaining in the evaporator tank 47 to the engine 23 provides a liquid feed to the carburetor 33 which has a narrow boiling point range while the initial fuel mixture in tank 29 and a wide boiling point range (of 90 to 450 degrees F.). Following such use of the liquid fraction of fuel (from tank 29) in tank 47, switch 86 is again turned to its "on" position and switch 87 is turned "off" to thereby form more vapor from fuel passed from tank 29 to tank 47 and such vapor then made is used to drive engine 23 and vehicle 21. Following that treatment of the gasoline fuel of tank 29, switch 87 is turned on and switch 86 is turned off for further use of the liquid fraction in tank 47.

When control switch 85 is put into its on or closed circuit mode, with switch 87 also in "on" or closed circuit position, fan 71 is actuated and serves to help empty the liquid in the tank 47.

Valve 68 may be opened or closed manually; when valve 68 is open, with normally closed valve 66 in closed positions, as when switches 86 and 87 are in closed position, tank 47 may be cleared of hydrocarbon vapors.

A blocking partition or louvre 190 is provided for manual positioning in front of the front face of the radiator 32 to reduce air flow through the radiator 32 and so avoid or limit cooling of the coolant from engine block 31 below 130 degrees F.

Embodiment 120

In the system 120 of invention, diagrammatically shown in FIG. 8, all the components of engine 23 outside of the area 140 shown in dashed lines in FIG. 8 are the same as in embodiment 20, above described and shown in FIG. 2, but other components and connections are different from embodiment 20 as below described.

The system 120 of invention comprises a combination of (a) the internal combustion engine 23 and the fuel supply assembly therefor and (b) an auxiliary fuel treatment system 140. One part of the internal combustion engine of particular significance to this system and which is modified in the system 120 is as in embodiment 20, the portions thereof that provide heated cooling liquid to radiator 32 of engine 23. The fuel storage and delivery system of the engine 23, which normally passes a liquid vaporizable combustible fuel mixture to the carburetor of the engine, is also modified to cooperate with the auxiliary fuel treatment system 140.

The apparatus of embodiment 120 is attached onto an internal combustion engine powered vehicle as the pick-up truck 21. In embodiment 120 of this invention an evaporator chamber 147 is provided for attachment to vehicle 21 and operates on the liquid fuel mixture fed from the fuel tank 29 into engine block 31.

An evaporator chamber assembly 156 comprises a rigid cylindrical insulated tank attached firmly to the right front wheel well 157 in compartment 27, a plurality of spray heads, a spray head conduit and heater coils. The spray heads are each the same as spray heads 48 and 148 and each of those spray heads is located in tank 147 and firmly attached to and supported by a spray head conduit 169. Spray head conduit 169 which is interior of the chamber 147 is fed by a rigid spray conduit line as 146 exterior to that tank. Line 146 is connected through a filter 160 to conduit 169. Conduit 146 is operatively connected through valving, below described, to the fuel tank 29.

The evaporator chamber 147 has, at its bottom, an evaporator liquid discharge conduit line, 159, which line connects to the interior of the evaporator chamber 147 and also connects via a solenoid controlled valve 95 and a pump as 92 to the conduit 57.

The auxiliary fuel pump 92 is attached to and driven by the fan belt of engine 23. The discharge conduit 192 of the pump 92 in embodiment 120 is connected by one arm of a tee 90 to a solenoid controlled valve 95 and therethrough to the carburetor feed conduit line 57; another arm of the tee 90 connects to the spray head feed conduit 146.

The liquid discharge conduit line 159 extends to the inlet of the pump 92 in compartment 27. The discharge conduit 192 of pump 92 extends from tee 90 to a juncture of conduits 192 and 146.

The evaporator chamber 147 is a rigid insulated gas-tight chamber within which are located evaporator coil assemblies 161 and 162, and a spray head assembly 166. The spray head assembly comprises a plurality of like spray heads as 48 and 148. Each spray head as 48 has a cylindrical skirt 137 and a rigid head 138 with a small orifice, 139, of 3/64 inch (1.2 millimeter) in diameter. Such head serves to form a spray when gasoline at 4 to 6 p.s.i. liquid pressure is applied to the interior of that spray head. The spray heads are operatively connected to and supported on a rigid spray head conduit 169. Conduit 169 is a rigid pipe supported near the top of chamber 147 and spaced away from coil assembly 161 and supports the spray heads as 48 at a distance from the parts of the coil assembly 161.

The supply evaporator coil assembly 161 comprises a plurality of rigid helical or flat evaporator coil segments like 62 and is connected to a coil inlet conduit line 63 and to a coil outlet conduit line 64. Assembly 161 is located in the upper half of the height of the tank 147 and above the usual liquid surface 167 of the body of liquid 165 usually in tank 147 in operation of the system 120. A smaller flat heater coil 162 is located in the lower third of the tank 147 and is located below the usual top level of liquor in tank 147 and is connected to the inlet heater conduit line 63 and outlet heater conduit line 64 by conduit lines 163 and 164 of the lower heater coil.

An evaporator discharge conduit line 178 comprises a tee 177 which connects to an evaporator waste conduit line valve 179 and also connects via throttle valve 182, which has the same structure and operation as valve 82 in embodiment 20, to the inlet of the gas carburetor 81. A substantial amount of insulation 174 evenly surrounds all walls of the tank 147.

A fan 170 like fan 71 is firmly supported in engine compartment 27 and is connected to battery 46 through a switch as 88. The discharge line 171 of such fan is connected to the interior of the chamber 147.

In embodiment 120 on-off control switches 185, 186 and 187 are the same in structure and position as the snap switches 85, 86 and 87 in embodiment 20; the switches 185, 186 and 187 are located on the dashboard 83 in the cab 26 of the vehicle 21 in the same position as are the control switches 85, 86, and 87.

When all of the switches 185, 186 and 187 are in their "off" or open circuit position and engine 23 is operating, gasoline from tank 29 is pumped by pump 52 through the open valve 55 and via conduit line 57 to carburetor 33.

When control switches 186 and 187 are put into their "on" (or closed circuit) position, and engine 23 is operating, fuel passes from tank 29 through then open (normally closed) valve 56 to tank 147 and vaporization of gasoline from tank 29 occurs in tank 147 and the resulting vapors are passed by conduit line 178 via throttle 182 (like 82 but in embodiment 120) to gas carburetors 81 and 83 and, under control of operator in cab 28 using foot pedal 134, to engine manifold 35. Concurrently the liquid gathered in tank 147 is cycled by pump 92 to the spray heads in tank assembly 156 because the normally open valves 55 is then closed by actuation resulting from closure of the electrical circuit from the battery 46 through switch 186. The switches 187 and 185 act, respectively, directly on the solenoids of valves 55 and 56. While vapor from tank 147 then passes along conduit 178 to the natural gas carburetor 81, the then continued operation of pump 92 then continuously returns the liquid portion 165 of liquor fed by spray heads thereof to tank 147 until substantially all the portions of the liquid gasoline mixture fed to tank 147 that can evaporate at the temperature of the evaporator coils 161 and 162 have been evaporated, although initially such liquid does not evaporate because the capacity of the coil assembly to evaporate liquid is smaller than the volume of liquid applied thereagainst by the spray heads.

After use of such vapor fraction and control at pedal 134, for a first period of time control switches 186 and 185 are put into on position (their closed circuit mode) and the liquid 165 in the tank 147 is passed from the tank 147 through the pump 92 and via then open (normally closed) valve 95 to conduit line 57 and thence to carburetor 33 for a second period of time immediately following the first period of time. That feeding of the fractions of fuel remaining in the evaporator tank 147 to the engine 23 provides in that second period of time a liquid feed to the carburetor 33 which has a narrow boiling point range, while the initial fuel mixture in tank 29 has a wide boiling point range (of 95 to 450 degrees F.).

Following such use of that liquid gasoline fraction of fuel from tank 29, switches 186 and 187 are actuated to form more vapor from the fuel passed from tank 29 to tank 147, and such vapors are used for a third period of time following the same period to drive the engine 23 as above described for the first period of time. Following that treatment of the fuel for that third period of time switches 185 and 186 are put into their "on" position for further use during and following fourth period of time of the liquid fraction of the gasoline then in tank 147, as above described for the second period of time. Such use of the gasoline fuel for sequential periods of time as above described for the first and second or first, second and third, or second, third and fourth periods may be repeated until all portions of the fuel initially in tank 29 are consumed.

Figure 14:
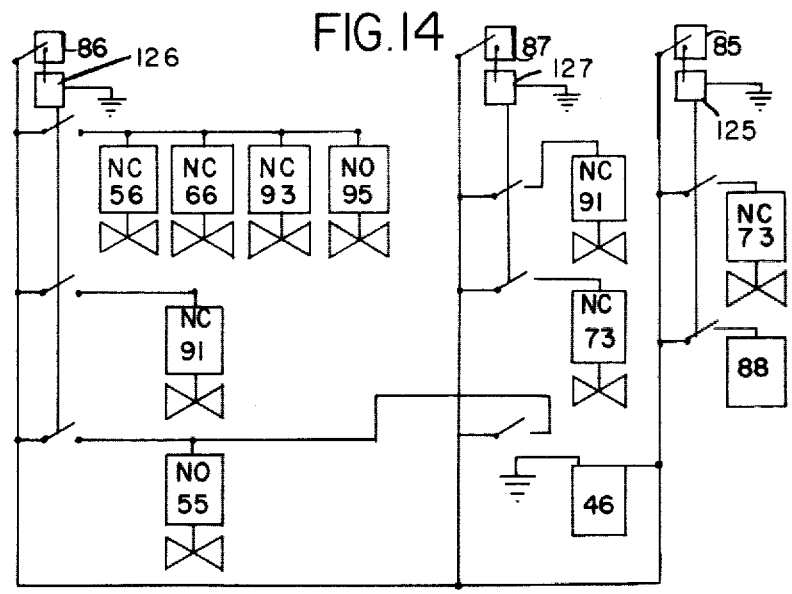
FIG. 14 diagrammatically illustrates switch control connections for the system of embodiment 20.
Figure 15:
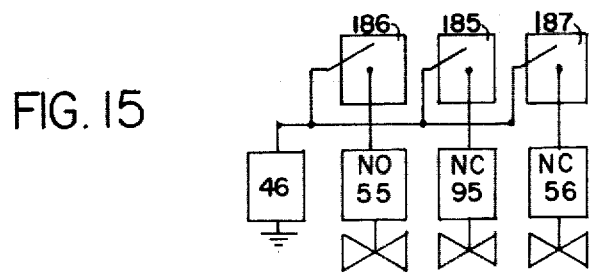
FIG. 15 diagrammatically illustrates switch control connections for embodiment 120.

As diagrammatically shown in FIG. 14, the main heater outlet line 143 from line 64 from the heater coil assembly 61 in tank 47 and from the discharge line 42 from cab heater 39 may return to a series connection to the inlet opening 132 of the radiator 32, so that the engine coolant outlet opening 131 connects to the radiator 32 in series through the coil assembly of the evaporator 47 and cab heater rather than directly by line 37 as shown in FIGS. 2 and 8, but the parallel connection of radiator 32 and coil 60 (or 1671 and 162) and cab heater 39 as shown in FIGS, 2, 8, 9, and 11 is preferred.

FIGS. 1, 3, 4, 5, 6, 7, 9, 11 and 12 are drawn to scale so dimensions may be approximated therefrom. The engine 23 is a 318 cu. in. V-8 engine. Vehicle 21 is a Dodge 1976 type 318 pick-up truck. The natural gas carburetor 81 is a Murphy valve model SD-12; the carburetor 33 is a standard factory gasoline carburetor (IMPCO, Model CA-125). Tank 147 is formed from a 12 inch internal diameter steel pipe 25 inches long closed at its ends with an internal volume of approximately 2800 cubic inches. The pressure internal of the spray heads as 48 in embodiments 20 and 120 is 6 p.s.i.

In embodiment 120, a temperature sensor 191 on conduit 37 provides for actuating a mercury valve 197 at 140 degrees F. which valve controls a take-off line 195 and feed line 196 from the vacuum line of the vehicle 21 to actuate a cylinder 199 for a piston and a linkage 194 which are attached to the radiator frame and automatically close the normally open louvres 193 on the radiator 32. The filter 160 is a No. 1 diesel filter. There are 8 feet of tubing, ⅜ inch; i.d., ½ inch o.d., in tubing assembly 161 and 30 inches of such tubing in assembly 162.

A pressure sensor 151 is connected to the tank 147 and has a reading gauge for reading pressure at the dashboard 83. When system 120 operates normally, gauge 151 reads 3 to 4 p.s.i.

With the apparatus of embodiment 120 on vehicle 21 operating at a speed of 55–60 miles per hour, a mileage of 56.8 miles per gallon of standard gasoline as fuel in tank 29 is provided. The radiator temperature is then steady at 140 degrees F.

With the apparatus of embodiment 20, 42.25 miles per gallon were obtained with vehicle 21, and the radiator temperature was then steady at 150 degrees F. Without the apparatus of embodiments 20 or 120, the vehicle 21 operates at 15 to 16 miles per gallon.

By such operation of the apparatus of embodiment 120, finely divided metals, comprising iron, copper, lead, zinc and magnesium are caught in the filter 160.

I claim:

1. In a vehicle comprising a liquid cooled gasoline fuel internal combustion engine with a cooling system and fuel system, and a frame, said engine and a passenger compartment mounted on said frame, and a radiator operatively attached to an engine block of said engine by coolant conduits connected to and extending between said radiator and said engine block, the improvement which comprises a fuel treatment apparatus incorporated into the cooling system and fuel system of said internal combustion engine, said fuel system comprising a fuel tank, a fuel pump and a carburetor, said fuel tank connected to said fuel pump, said fuel pump connected by a first conduit to said carburetor, said carburetor connected to said engine block;

said fuel treatment apparatus comprising, in operative combination, an evaporator chamber, four conduits and four valves, said evaporator chamber comprising rigid chamber walls and an evaporator chamber therein, a plurality of spray heads and coolant conduit coils within said evaporator chamber, said spray heads connected to a second, spray head, conduit line, said second spray head conduit line connected to a first conduit at a first conduit connection connected to said first conduit, a first valve in said second conduit between said first conduit connection and said evaporator chamber, a filter between said first valve and said evaporator chamber, a third, liquid discharge, conduit connected to the bottom of said evaporator chamber and a fourth, vapor discharge, conduit connected to said evaporate chamber near to the top of said chamber, said third, liquid discharge, conduit connected to the inlet of a second pump, said second pump operatively connected to said engine block, a discharge conduit of said second pump connected at a second conduit connection attached to said first conduit through a second valve and to said second, spray head, conduit at a third conduit connection located between said first valve and said filter, a third valve in said first conduit, said third valve located between said first conduit connection and said second conduit connection, a fourth valve in said fourth conduit, said fourth, vapor discharge, conduit connected to an intake of said carburetor, said fourth valve located between said carburetor and said evaporator chamber, liquid conduits for coolant connected to and extending between said engine block and said coolant conduit coils in said evaporator chamber and also connected to and extending between said engine block and said radiator, and control means for each of said valves in said passeger compartment.

2. Apparatus as in claim 1 also comprising fan means having an outlet operatively attached to said evaporator chamber.

3. Apparatus as in claim 1 wherein said radiator has an intake end for entry of air thereinto and said fuel treatment apparatus also comprises air flow blocking means on the intake end of said radiator.

4. Apparatus as in claim 3 wherein said fuel treatment apparatus also comprises sensing means sensitive to the temperature of coolant liquid exiting from said engine block and automatic means responsive to said sensing means and operative to move said air flow blocking means.

5. Apparatus as in claim 1 wherein said engine is located in an engine compartment in said vehicle and said evaporator chamber is located in said engine compartment.

6. A gasoline fuel treatment apparatus for use in a vehicle comprising a liquid cooled gasoline fuel internal combustion engine with a cooling system and fuel system and a frame, said engine and a passenger compartment mounted on said frame, and a radiator operatively attached to an engine block of said engine by coolant conduits connected to and extending between said radiator and said engine block, said fuel system comprising a fuel tank, a fuel pump and a carburetor, said fuel tank connected to said fuel pump, said fuel pump connected by a first conduit to said carburetor, said carburetor connected to said engine block, said fuel treatment apparatus comprising an evaporator chamber, four conduits and four valves, said evaporator chamber comprising rigid chamber walls and an evaporator chamber therein, a plurality of spray heads and coolant conduit coils within said evaporator chamber, said spray heads connected to a second, spray head, conduit line, said second spray head conduit line connected to a first conduit at a first conduit connection connected to said first conduit, a first valve in said second conduit between said first conduit connection and said evaporator chamber, a filter between said first valve and said evaporator chamber, a third, liquid discharge, conduit connected to the bottom of said evaporator chamber and a fourth, vapor discharge, conduit connected to said evaporator chamber near to the top of said chamber, said third, liquid discharge, conduit connected to the inlet of a second pump, said second pump operatively connected to said engine block, a discharge conduit of said second pump connected at a second conduit connection attached to said first conduit through a second valve and to said second, spray head, conduit at a third conduit connection located between said first valve and said filter, a third valve in said first conduit, said third valve located between said first conduit connection and said second conduit connection, a fourth valve in said fourth conduit, said fourth, vapor discharge, conduit connected to an intake of said carburetor, said fourth valve located between said carburetor and said evaporator chamber, liquid conduits for coolant connected to and extending between said engine block and said coolant conduit coils in said evaporator chamber and also connected to and extending between said engine block and said radiator, and control means for each of said valves in said passenger compartment.

7. Apparatus as in claim 6 also comprising fan means having an outlet operatively attached to said evaporator chamber.

8. Apparatus as in claim 6 and also comprising sensing means sensitive to the temperature of coolant liquid exiting from said engine block and automatic means responsive to said sensing means and operative to move said air flow blocking means.

9. A process of operating a liquid cooled gasoline fueled internal combustion engine fed with a fuel having a wide range of boiling point, said process comprising operating said engine by (a) combusting said fuel into said engine and thereby heating a coolant liquid, passing the thereby heated coolant into a vaporizing chamber and passing said fuel into said heat exchange with the heated coolant in said chamber and thereby, for a first period of time, vaporizing a portion of said fuel in said vaporizing chamber and passing said vaporized portion of said fuel from said vaporizing chamber into a carburetor and there mixing said vaporized portion of fuel with air and passing the resulting mixture into said engine and combusting said fuel while concurrently drawing liquid from said vaporizing chamber and returning said liquid to said vaporizing chamber and there vaporizing a portion of said returned liquid and passing the resulting vaporized portion of said returned liquid to said engine for combustion thereof, then (b) terminating passage of said vapors from said vaporizing chamber to said carburetor and, for a second period of time, passing the portion of said cycled liquid which is then not vaporized from the bottom of said vaporizing chamber to said carburetor and there mixing said liquid with air and forming a combustible fuel mixture and passing said combustible fuel mixture to said engine and then, at the end of said second period of time, terminating the passage of liquid fuel from said vaporizing chamber to said carburetor and, (c) for a third period of time, passing additional wide boiling point range fuel to said vaporizing chamber and then forming a vapor portion and a liquid portion therefrom, and passing the resulting vapor portion to said carburetor and engine and cycling then then remaining liquid then in said vaporizing chamber to said vaporizing chamber for further heat exchange in said chamber and vaporization of a further portion of said cycled liquid portion.

10. Process as in claim 9 where the fuel is gasoline with a boiling point range of 90–450 degrees F.

11. Process as in claim 10 wherein the coolant liquid from said engine is passed through a radiator and there cooled and cycled from said radiator back to said engine block and the temperature of said coolant liquid is maintained in the range of 130–150 degrees Fahrenheit.

* * * * *